Oct. 3, 1967     A. HORNE     3,344,832
PNEUMATIC TIRE
Filed Sept. 8, 1965
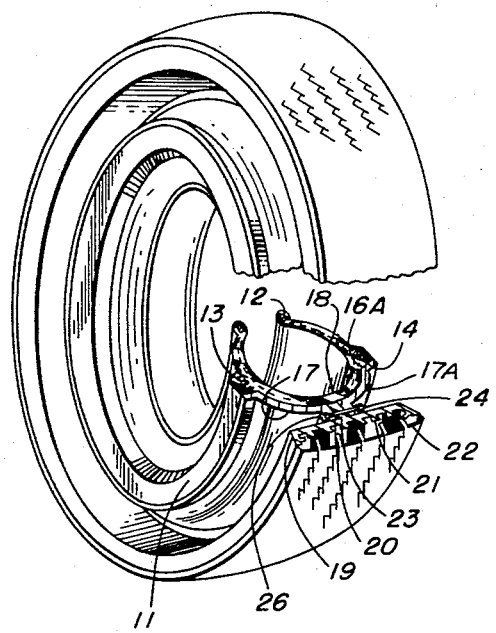
FIG. 1
FIG. 2
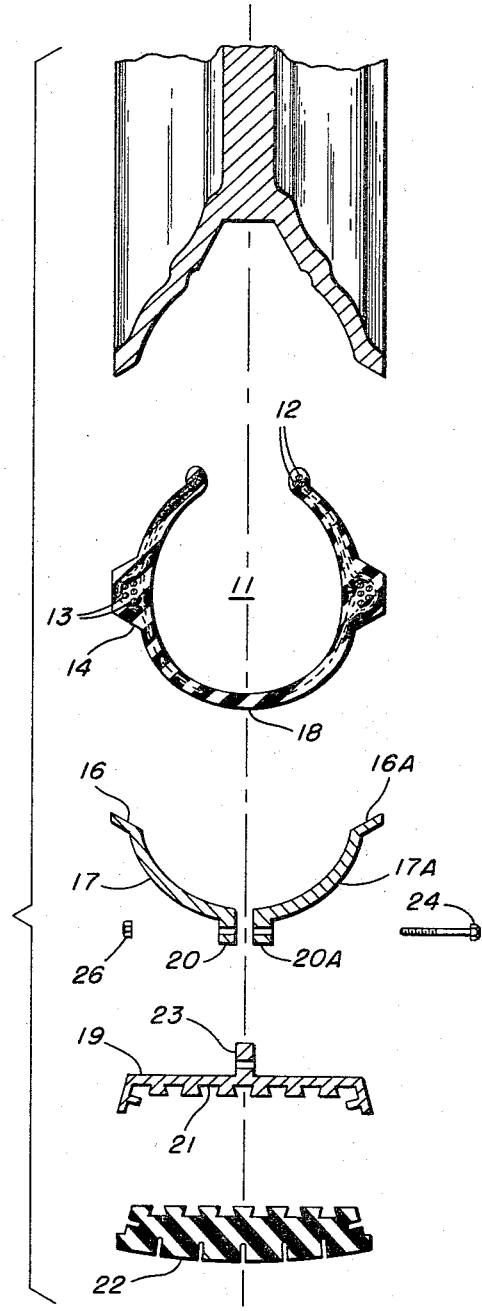
INVENTOR.
ALFRED (NMI) HORNE
BY
Richard K. Macneill

3,344,832
PNEUMATIC TIRE
Alfred Horne, 417 Market, San Diego, Calif. 92101
Filed Sept. 8, 1965, Ser. No. 485,777
1 Claim. (Cl. 152—175)

ABSTRACT OF THE DISCLOSURE

A pneumatic tire having a two-piece metallic casing bolted to the outside periphery thereof with a layer of tread material attached on the outside of the metallic casing.

---

The present invention relates to an improved pneumatic tire, and more particularly to an improved pneumatic tire having a detachable tread section.

According to the invention, a pneumatic tire is provided having conventional rim beads and larger side beads providing a shoulder support. No tread is provided on the outside portion of the tire itself. A rigid outside casing, preferably metallic, is provided, in two symmetrical halves terminating in a pair of flanges resting on the supporting shoulder provided by the large side beads of the tire. To this outside casing is attached another rigid, preferably metallic, support member on the outside of the outside casing for carrying a solid rubber or synthetic tread material. The tread member is preferably bonded, as by vulcanizing, to the outside support member.

An object of the present invention is the provision of an improved pneumatic tire having a detachable tread portion.

Another object is to provide an improved pneumatic tire having a very high structural strength.

A further object of the invention is to provide an improved pneumatic tire which is puncture and blowout proof.

Still another object is to provide an improved pneumatic tire in which the tread portion can be replaced indefinitely.

Yet another object of the invention is to provide an improved pneumatic tire which is simple and economical to manufacture and install.

Other objects and many of the attendant advantages of this invention will be readily appreciated as the same becomes better understood by reference to the following detailed description when considered in connection with the accompanying drawings, in which like referenced numerals designate like parts throughout the figures thereof, and wherein:

FIG. 1 is an exploded sectional view in perspective of the preferred embodiment of the present invention;

FIG. 2 is a cross-sectional view of the entire assembly of the embodiment of FIG. 1.

Referring to both FIGS. 1 and 2, a pneumatic tire is shown generally at 11 having rim beads 12 for support on a conventional wheel rim. Side beads 13 form supporting shoulders 14 for carrying flanges 16 of outer casing members 17 adn 17A. Outer casings 17 and 17A are contoured for a snug fit over top rounded section 18 of pneumatic tire 11 when inflated.

Outer support member 19 has a serrated top surface 21 which holds tread portion 22. An inwardly extending flange member 23 cooperates with extensions 20 and 20A of outer casings 17 and 17A. Extension 23 and extensions 20 and 20A have a plurality of bores for cooperation with a plurality of bolts 24 and nuts 26, securing them together.

In installation or assembly, inner pneumatic tire 11 is first placed on a conventional wheel rim with outer support member 19 outside and surrounding pneumatic tire 11. The outer casing members 17 and 17A are then moved into position, and bolts 24 and nuts 26 screwed into place through the apertures in extensions 20, 20A and 23. The tire 11 is then inflated, creating a snug fit between outer casings 17 and 17A and the rounded top portion 18 of tire 11.

It can be seen that when the tread portion 22 is worn down, the unit can be disassembled, and this portion, together with outer support 19, replaced, forming a substantially new unit, since the only appreciable wear will be on the outer tread portion 22.

It should be understood, of course, that the foregoing disclosure relates to only a preferred embodiment of the invention, and that it is intended to cover all changes and modifications of the example of the invention herein chosen for the purposes of the disclosure which do not constitute departures from the spirit and scope of the invention.

What is claimed is:

An improved pneumatic tire having a detachable tread section comprising;
    an inflatable portion having rim beads for supporting said inflatable portion on a wheel rim and a pair of side shoulders having supporting beads therein;
    a rigid outside casing having two substantially symmetrical halves said outside casing having a pair of flanges cooperating with said side shoulders and resting thereon; and
    a circular integral tread member having a tire tread on the outside surface thereof; and
    an inside rigid casing carrying said tread member, said inside rigid casing being fixedly attached to said rigid outside casing.

References Cited

UNITED STATES PATENTS

| | | | |
|---|---|---|---|
| 1,268,258 | 6/1918 | Manuel | 152—175 X |
| 1,491,864 | 4/1924 | Johnson | 152—175 |
| 2,190,370 | 2/1940 | Smallwood et al. | 152—175 X |

ARTHUR L. LA POINT, *Primary Examiner.*

C. W. HAEFELE, *Assistant Examiner.*